Feb. 20, 1934.  N. L. ABERSON  1,948,087
MACHINE FOR MAKING MULTIPLE UNIT STRUCTURAL SLABS
Filed April 17, 1933  2 Sheets-Sheet 1
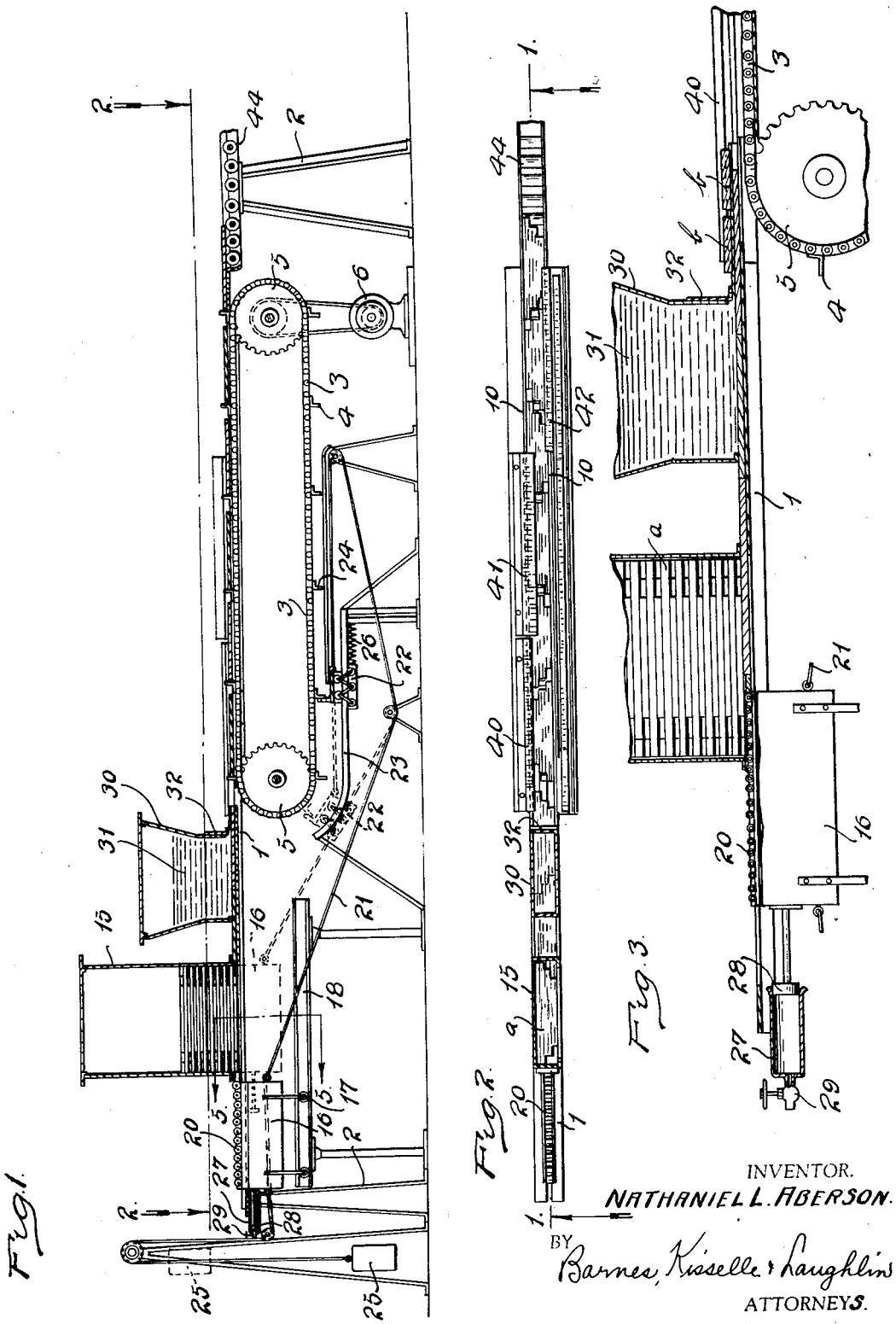
INVENTOR.
NATHANIEL L. ABERSON.
BY Barnes, Kisselle & Laughlin
ATTORNEYS.

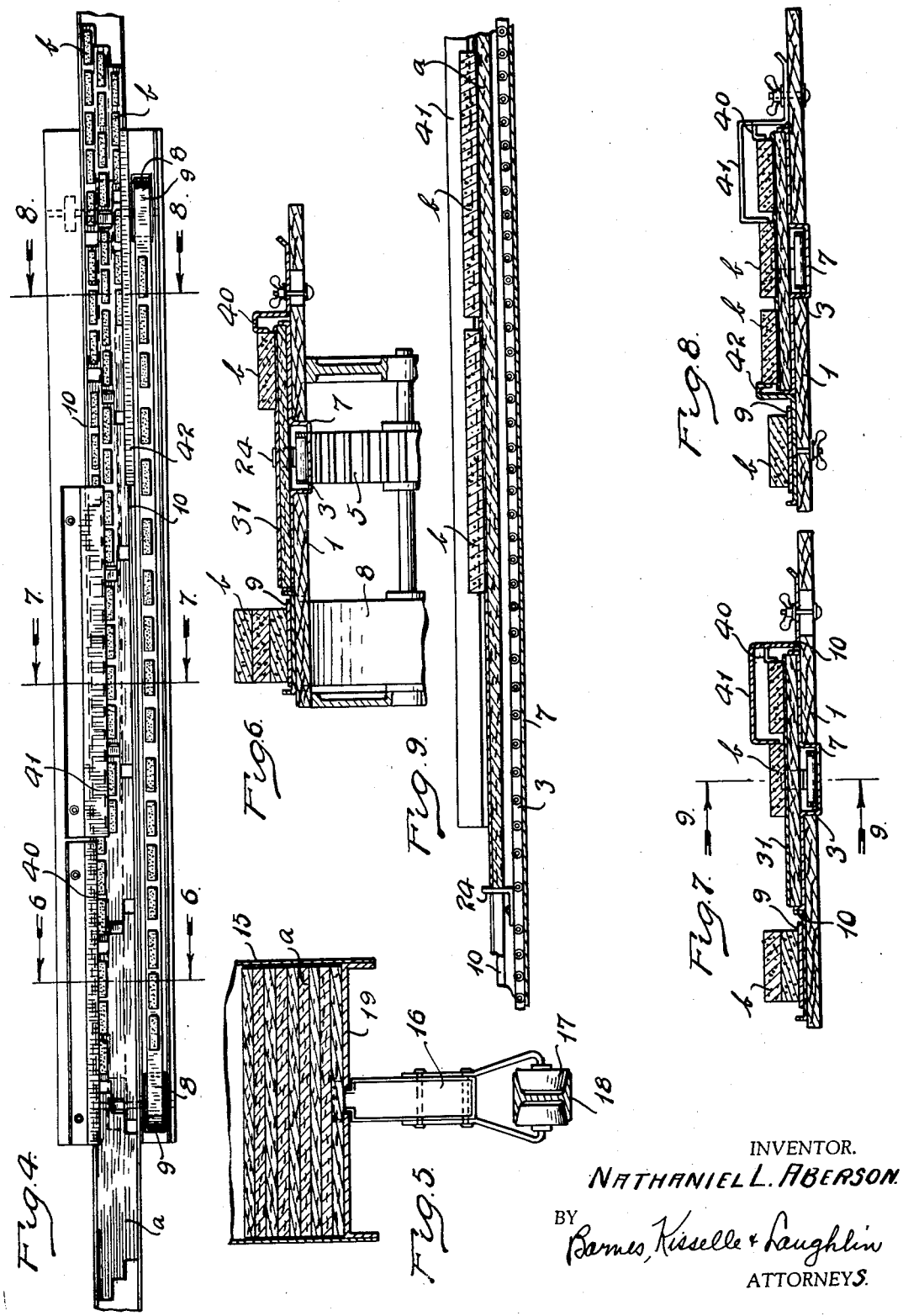

Patented Feb. 20, 1934

1,948,087

UNITED STATES PATENT OFFICE 1,948,087

MACHINE FOR MAKING MULTIPLE UNIT STRUCTURAL SLABS

Nathaniel L. Aberson, Detroit, Mich.

Application April 17, 1933. Serial No. 666,453

10 Claims. (Cl. 154—1)

This invention relates to a machine for making a multiple unit structural slab.

The slab referred to may be one which comprises a backing of wall-board, insulating-board, or other compositions, or wire netting, sheet metal or the like, carrying a plurality of units simulating structural units such as bricks. These structural units may be made of a material similar to, or identical to, the material of which the ordinary structural brick is made, but preferably is relatively thin. These briquets are arranged on the backing with suitable spaces between them representing the spaces ordinarily accommodating the cement or mortar of a brick structure. So far as the present invention is concerned the backing may be of any desired shape and the shape is subject to variation so as to accommodate any desirable arrangement of briquets.

The machine contemplated by the present invention involves generally an arrangement obtaining certain automatic operations, providing means for feeding the sheets of backing, means for feedings the briquets, and providing an arrangement of guides which facilitate proper placement of the briquets on the moving backing. Likewise means are provided for applying an adhesive to the backing for uniting the briquets thereto. Other objects and features of the invention will become apparent as the description progresses.

In the accompanying drawings:

Fig. 1 is a vertical sectional view of a machine constructed in accordance with the invention taken substantially on line 1—1 of Fig. 2.

Fig. 2 is a top plan view taken substantially on line 2—2 of Fig. 1.

Fig. 3 is an enlarged sectional view showing particularly the hopper structure for the adhesive and magazine for the sheets of backing.

Fig. 4 is a somewhat diagrammatic view of the portion of the machine used for applying the briquets to the backing.

Fig. 5 is an enlarged sectional view taken substantially on line 5—5 of Fig. 1, illustrating the structure of the magazine feed arrangement.

Fig. 6 is an enlarged sectional view taken substantially on line 6—6 of Fig. 4.

Fig. 7 is an enlarged sectional view taken substantially on line 7—7 of Fig. 4 showing one of the guide arrangements.

Fig. 8 is a sectional view taken substantially on line 8—8 of Fig. 4 showing a guide arrangement.

Fig. 9 is an enlarged sectional view taken substantially on line 9—9 of Fig. 7.

The machine comprises essentially a table-like structure 1 suitably supported by legs 2 or the like. An endless conveyer which may be in the form of a chain 3 having cleats 4 thereon operates over sprockets 5 which may be driven by a suitable motor 6. This endless conveyer, as shown in Figure 7, lies in a channel part 7 in the table. On the same axis with the sprockets there may be pulleys 8 (Fig. 4) over which runs a conveyer belt 9 which, as shown in Figs. 7 and 8, has its upper run extending over the edge of the table 1.

The table is formed with lengthwise guides 10 (Fig. 7) the width of which is designed to fit the width of the particular slab or backing which is being used. The shape of the particular slab disclosed herein is illustrated in Fig. 4 where the slabs are shown at $a$, and upon these slabs briquets $b$ are to be fastened as by means of a suitable adhesive. The briquets may be placed upon the backing sheets as illustrated, leaving spaces between them and the resultant structure is a multiple unit slab presenting the appearance of a section of a brick wall structure, or the like.

The sheets of backing may be placed in a magazine 15 and preferably every other sheet, where the sheets are of the shape shown herein, is reversed end for end. The bottom sheet in the hopper is arranged to be pushed out of the hopper, and this is done by means of a pusher device which, as shown in Fig. 5, comprises a body 16 having rollers 17 running in a track which may be a T-iron, as shown at 18. The ejector projects up through a slot in the bottom 19 of the hopper. The upper portion of this member is provided with rollers 20. Connected to this ejecting device is a rope or cable 21 running over suitable pulleys as shown and connected to a dolly 22 having rollers running on a track device 23. This dolly is arranged to be picked up by cleats 24 on the endless conveyer 3 and pulled from right to left, as Fig. 1 is viewed, to the dotted line position. This pulls the ejecting device forwardly to the dotted line position and pushes a sheet of backing out of the magazine. Substantially at the dotted line position a cleat releases the dolly and the ejecting device is then retracted by a weight 25 connected to the ejecting device by means of a suitable rope or cable running over pulleys as shown. A buffer spring 26 cushions the return movement of the dolly. A dash-pot may be employed for cushioning the return movement of the ejector and this may comprise an open ended cylinder 27 into which a plunger or piston 28 on the ejector enters. The dash-pot action may be regulated by a regulatable check valve in the closed end of the cylinder.

When one of the backing slabs is pushed out of the hopper, the slab in front of it is pushed forward one step. As the slabs move from the magazine they pass under a hopper 30 containing adhesive 31 and the hopper may have a regulatable gate 32. As the sheets pass under the adhesive, the adhesive is sort of rolled over or churned, so to speak, and a layer of it deposits upon and works into the surface of the sheets. It will be noted that the ends of the backing sheets abut, as shown in Fig. 2, near the left hand end thereof, so that the adhesive does not readily move in between the ends of the backing sheets. As a sheet approaches the table a cleat 24 comes in behind it, catches behind it and advances it, as clearly shown in Fig. 4, and the cleats are spaced so that there is one cleat for each slab. The slabs then move across the table with substantially uniform movement.

While the slabs are moving across the table, propelled by the cleats on the endless conveyer, the briquets are applied. One line of briquets are laid upon the backing slab at the position indicated by the line 6—6 of Fig. 4, and there is a guide device 40 against which these briquets may be placed to accurately position them with regards to the edge of the backing (Fig. 6). This guide is preferably adjustable. The middle row of briquets is placed on the backing at the station substantially represented by the line 7—7 of Fig. 4. For this purpose there is a guide device 41, preferably adjustable as shown (Fig. 7) for properly positioning the center line of briquets and properly spacing them from the first line of briquets. The third line of briquets may be placed upon the backing at substantially the position illustrated with the line 8—8 of Fig. 4, and a guide device 42 may be employed for properly positioning these briquets with respect to the edge of the backing and with respect to the middle row of briquets. Accordingly it will be noted that a man may be stationed at each position. After the briquets are applied the slabs are released by the cleats and pushed out upon rollers 44.

The briquets may be fed to the workmen by the endless belt 9. The briquets may be placed upon the belt near the left hand end thereof, as Fig. 4 is viewed, and may be irregularly placed and piled upon each other as illustrated in Figs. 6 and 7 so that an adequate supply is provided. The workmen applying the briquets merely pick them up and place them on the backing sheets, and no skill is required in properly manipulating and slightly vibrating or oscillating the briquets to fit them well into the adhesive. The spacing between the ends of the briquets is preferably left to the judgment and skill of the operators with the result that there is a little variation, the better to make the completed slab appear more like a brick structure and not too perfect.

It will be noted that since the endless belt which propels the slabs across the table is utilized to feed the backing sheets out of the magazine and out of the hopper that the entire machine works in unison. The backing sheets are flush end to end as they are being pushed, and become spaced as they are picked up by the cleats on the endless conveyer. The stack of backing sheets in the magazine may have considerable weight; for this reason the rollers 20 are provided so that the ejecting device may slip more easily into and out of the magazine under the weight of the sheets. A rather quick return is desired for the ejecting device in order to get it out of the magazine so that the backing sheets therein may move down upon the table. This is accomplished by the weight 25 and to cushion the return movement the dash-pot cylinder 27 and spring 26 are provided for the ejector 16 and the dolly 22 respectively.

It is to be emphasized that the use of the word "briquets" in this case is intended to cover various kinds and forms of building structural units. As above pointed out, the briquets may be so arranged as to simulate a brick wall. They also may be arranged and provided of such material as to simulate, for example, stone work. The briquets may be thin stone or of any desirable composition, and one example, is the forming of the briquets from sheet material such as an asbestos and cement composition. However, such asbestos and cement composition can be used where the slab is to simulate a brick wall.

I claim:

1. A machine for making multiple unit structural slabs having a plurality of briquets or the like mounted upon a backing member, comprising means for propelling the backing members one after another substantially in a straight path, and a plurality of guide devices positioned at different points of transverse of the width of the backing members, there being one guide device for each row of briquets to be placed upon the backing member and against which the briquets are to be placed for proper location.

2. A machine for making multiple unit structural slabs having a plurality of briquets or the like mounted upon a backing member, comprising means for propelling the backing member one after another substantially in a straight path, and a plurality of guide devices positioned at different points transverse of the width of the backing members, there being one guide device for each row of briquets to be placed upon the backing member and against which the briquets are to be placed for proper location, said guide device being of substantial length whereby a briquet may be positioned thereby as it is held upon a moving backing member.

3. A machine for making multiple unit structural slabs having a plurality of briquets or the like mounted upon a backing member, comprising propelling means for propelling a series of sheets of backing material successively one after another, a guide device overlying one edge of the moving backing sheets against which a row of briquets are adapted to be positioned, and another guide device constructed so that the first mentioned row of briquets may pass thereunder and arranged so that a second row of briquets may be located by being placed against the said second guide device.

4. A machine for making multiple unit structural slabs having a plurality of briquets or the like mounted upon a backing member, comprising propelling means for propelling a series of sheets of backing material successively one after another, a guide device overlying one edge of the moving backing sheets against which a row of briquets are adapted to be positioned, a second guide device constructed so that the first mentioned row of briquets may pass thereunder and arranged so that a second row of briquets may be located by being placed against the said second guide device, and another guide device similar to the first and positioned so as to overlie the edge of the backing sheets opposite the edge which the first mentioned guide device overlies.

5. A machine for making multiple unit structural slabs having a plurality of briquets or the like mounted upon a backing member, comprising a track-like arrangement along which a plurality of backing members adapted to be passed in successive order, means for moving the backing members therethrough, guide devices overlying opposite edges of the backing members against which the edge rows of briquets may be placed for proper location, and a guide device overlying an edge row of briquets and having a depending part serving as a guide for an intermediate row of briquets.

6. A machine for making multiple unit structural slabs having a plurality of briquets or the like mounted upon a backing member, comprising a track-like device for guiding a plurality of backing members located one after another, an endless conveyer having cleats thereon with one cleat adapted to propel a single backing member through the track-like device whereby to move the backing sheets in successive order, and a plurality of long guide arrangements overlying the backing members on the track-like device against which briquets are to be placed for location.

7. A machine for making multiple unit structural slabs having a plurality of briquets or the like mounted upon a backing member, comprising a magazine for holding a multiplicity of backing sheets in superimposed position, said magazine having an opening in one side near the bottom thereof, an ejector device movable into the bottom of the magazine for ejecting one sheet at a time therefrom, whereby the ejected sheets are moved step by step, and an endless conveyer having propelling devices thereon for picking up the sheets and propelling them with substantial uniform movement.

8. A machine for making multiple unit structural slabs having a plurality of briquets or the like mounted upon a backing member, comprising a magazine for holding a plurality of backing sheets in superimposed position, means for ejecting the backing sheets one by one from the lower part of the magazine, adhesive applying means for applying adhesive to the ejected backing sheets, means for picking backing sheets individually after the adhesive is applied for moving them substantially uniformly, and the guide devices overlying the uniformly moving backing sheets against which briquets are to be located and positioned when applied against the adhesive on the backing sheets.

9. In a machine substantially for the purpose described, an endless conveyer having cleats thereon for moving sheet-like members in successive order with a substantially uniform movement, a magazine for the sheet-like members, an intermittently operable ejector for ejecting the sheet-like members from the magazine one by one and for advancing them to the endless conveyer, means for operating the ejector, and cleats on the endless conveyer for moving said means a substantially predetermined distance to operate the ejector, said means being arranged to become released from the operating cleat after it is moved a predetermined distance.

10. In a machine substantially for the purpose described, an endless conveyer having cleats thereon for moving sheet-like members in successive order with a substantially uniform movement, a magazine for the sheet-like members, an intermittently operable ejector for ejecting the sheet-like members from the magazine one by one and for advancing them to the endless conveyer, means for operating the ejector, cleats on the endless conveyer for moving said means a substantially predetermined distance to operate the ejector, said means being arranged to become released from the operating cleat after it is moved a predetermined distance, means for retracting the ejector with rapid movement, and buffer means for the ejector and its operating means.

NATHANIEL L. ABERSON.